United States Patent
Hamminga

[11] 3,833,065
[45] Sept. 3, 1974

[54] HAULM PLUCKER

[75] Inventor: Auko Hamminga, Siddeburen, Netherlands

[73] Assignee: Transportbandenfabriek E.A. Broekema B.V., Hellum, Netherlands

[22] Filed: Jan. 29, 1973

[21] Appl. No.: 327,760

[30] Foreign Application Priority Data
Jan. 27, 1972  Netherlands............................ 1102

[52] U.S. Cl........................ 171/28, 171/58, 171/61
[51] Int. Cl............................................ A01d 23/00
[58] Field of Search............ 171/58, 61, 28; 56/126

[56] References Cited
UNITED STATES PATENTS
| | | |
|---|---|---|
| 988,405 | 4/1911 | Sweeney................................ 171/58 |
| 1,877,078 | 9/1932 | Stubenbers............................ 171/60 |
| 2,314,773 | 3/1943 | Dahlman................................ 171/58 |
| 2,365,077 | 12/1944 | Hertzler et al......................... 171/28 |
| 2,958,174 | 11/1960 | Lawson.................................. 171/58 |
| 3,710,564 | 1/1973 | Sammann.............................. 171/58 |

Primary Examiner—Antonio F. Guida
Attorney, Agent, or Firm—Frank J. Jordan

[57] ABSTRACT

A haulm plucker is provided with means forming a nip transverse to the direction of travel. At least one surface leading to the nip is moved at a relatively high speed, thereby to cause haulm to be separated from potatoes or other tuberous crop with a sudden jerk, which the crop buried in the soil is unable to follow. In a preferred embodiment the speed is adjustable to the kind of soil and crop.

11 Claims, 6 Drawing Figures

HAULM PLUCKER

This invention relates to a travelling haulm plucker, comprising at least one driven rotary member which together with another member forms a nip relatively closely spaced above the ground and open towards the ground, and said nip having at least one upwardly moving nip wall.

A prior apparatus gives no satisfactory results in practice, for instance, when plucking haulm of potato-plants, so that the potatoes may be harvested without the haulm by raking. In fact, especially when the soil is loose, the potato-plants are pulled up without the haulm being separated from the potatoes.

It is an object of the present invention to provide a haulm plucker which gives better results and is satisfactory in use even if the soil is very loose.

According to the invention, there is provided a travelling haulm plucker comprising at least one driven rotary member which together with another member forms a nip relatively closely spaced above the ground and open towards the ground, and said nip having at least one upwardly moving nip wall, characterized in that the nip extends transversely to the direction of travel of the plucker.

With the apparatus according to the invention the haulm can be pulled off the tubers in such a way that it becomes difficult for the tubers to follow the movement of the haulm held in the nip, so that the haulm is torn from the tuber or tubers by force. The separation of the haulm from the tubers can be greatly aided, according to the invention, by selecting a high speed for the moving nip wall or nip walls, preferably higher than the travel speed of the plucker. In a preferred embodiment of the invention, the bisectrix plane of the nip is forwardly and downwardly inclined. It is possible that one of the nip-forming members is stationary, for instance, a curved plate moving close to the soil, but two rotary members which together form the nip are preferred. The members rotating at the nip may comprise an endless belt or chain. One of these can also serve to feed the standing haulm to the nip, while the other may serve to discharge the plucked haulm. The two members may have a separate drive, but also, one member may be driven and take the other along in rotation through friction or the like. When a fixed plate and a roll or two rolls are used as the rotary members a separate conveyor belt can be disposed behind these. The lower nip-forming member preferably is arranged to press the soil under or a little behind the nip so as to retain the tubers. A pressing means extending along the nip can also be used for this purpose. The tractor can be constructed in such a way that such pressing means can follow the soil, either through the weight of the apparatus or through additional spring force.

The endless belt which may be used can be constructed as a screen belt; the rotary members may comprise axially extending ribs, which can more or less interengage as the members rotate so as to aid in holding the haulm. The apparatus may be constructed as an integral implement of a tractor, or have its own travelling frame for it to be coupled to a tractor. Preferably the haulm plucker is so constructed that it can be mounted at the front of a tractor. There may be several pairs of nip-forming members, so that more than one row of plants can be handled at the same time. The haulm plucker may also be so constructed that it can be mounted on the tractor at the side.

Some embodiments of the invention will be described by way of example with reference to the accompanying diagrammatic drawings. In the drawings:

FIG. 3 is a front elevation of the apparatus of FIG. 1;

FIG. 4 shows diagrammatically a detail in side elevation of a modified embodiment of a haulm plucker according to the invention; and FIG. 5 shows a side elevation, corresponding with FIG. 4, of still another embodiment.

Figure 1:
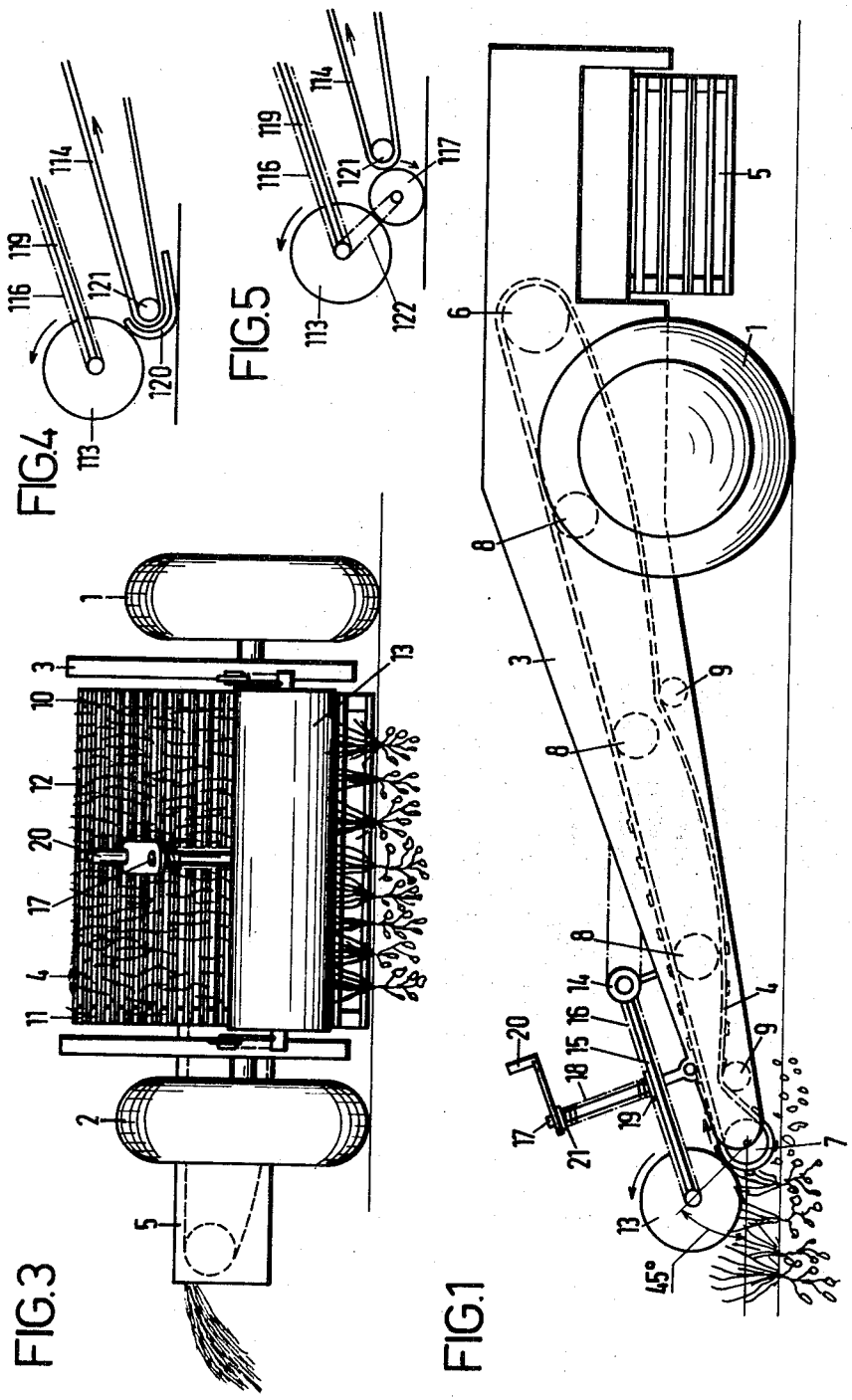
FIG. 1 shows a side elevation of a haulm plucker according to the invention.
Figure 2:
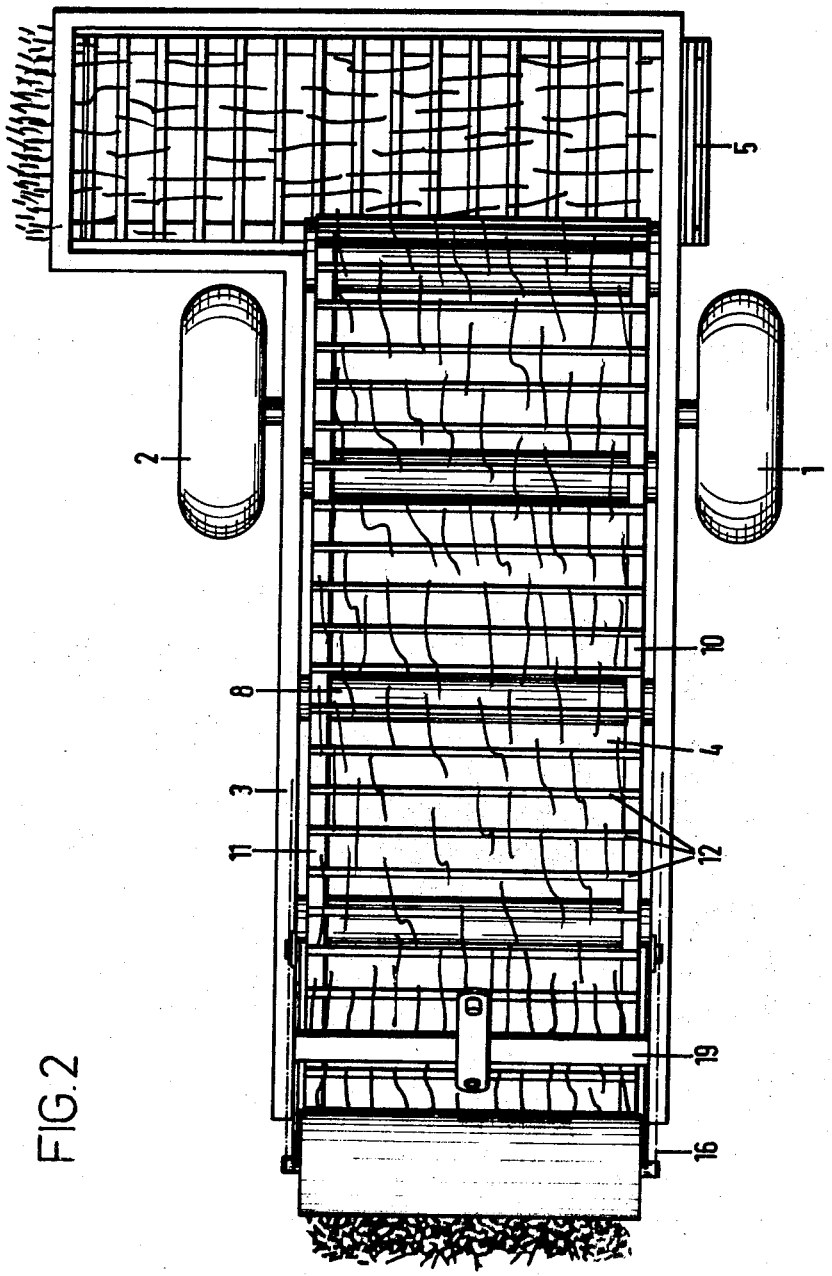
FIG. 2 is a plan view of the apparatus of FIG. 1.

The haulm plucker according to the first embodiment comprises a travelling frame 3 on wheels 1,2, on which two conveyor belts 4 and 5 are mounted on behind the other. The upper run of conveyor belt 4 moves in an inclined upward direction opposite to the direction of travel; conveyor belt 5 behind it moves transversely to the direction of travel.

Conveyor belt 4 is a so-called screen belt and consists of rubber straps 10, 11 between which steel bar 12 are provided which are, for example, riveted to the straps.

Screen belt 4 passes over a driving roller 6 and a return roller 7 and is furthermore supported by a number of idlers 8 and 9 situated therebetween. Above the front end of belt 4 a roller 13 is suspended from two arms 15 pivoting about a shaft 14, so that the roller rests against bar belt 4 at the front of return roller 7. Preferably the bisectrix plane of the nip formed by rollers 7 and 13, and hence the line connecting their axes make an angle of 45° with the horizontal. Roller 13 can be driven through chains 16, which give the roller the same peripheral speed as belt 4 has; in the nip the two members have an upwardly inclined direction of movement. On frame 3 a threaded rod 17 with a compression spring 18 are provided, which rod presses on arms 15 via cross bar 19 so as to ensure that roll 13 contacts the bars of belt 4. The tension of spring 18 can be set by means of nut 21 to be turned with handle 20.

The speed at which the belt is driven is, for instance, 30 to 40 per cent higher than that of the tractor. The result of this speed is that a jerking effect is created, so that, for example, potatoes are more apt to be restrained by the soil from following the haulm than in case the haulm is pulled up slowly. Furthermore pulley 7 and belt 4 hold back the soil and the potatoes or other tubers in the soil, which additionally ensures that the haulm is separated from the tubers.

The apparatus is preferably driven by means of hydraulic motors, because these allow speeds to be set as desired, which makes for adaptation to the type of soil and crop.

The apparatus can naturally be provided with the necessary accessories, such as a beater at the front for pre-treatment of the haulm and a potato share or scoop. Instead of a single pair of nip-forming members, a double construction may be used comprising two pairs of nip-forming members at both sides of the frame for stripping the haulm from plants grown in rows.

In FIG. 4, 113 is the top driven roller supported by the spring-loaded arm 119 and driven by chain 116. Roller 113 forms a nip with skid plate 120 fixed in the frame. Within the skid plate a bottom return roller 121 for the conveyor belt or chain 114 is situated. Roller 113, which may be provided with friction means such as ribs, pulls the haulm across the fixed smooth skid plate 120 and delivers them to conveyor belt 114, while plate 120 holds back the soil under the nip.

In FIG. 5, skid plate 120 shown in FIG. 4 has been replaced by a roller 117 which is also driven and behind which conveyor belt 114 is passed over return roller 121. The drive of roller 117 is taken from roller 113 through chain 122.

In the embodiments according to FIGS. 4 and 5 the drive of roller 113 may be variable.

Figure 6:
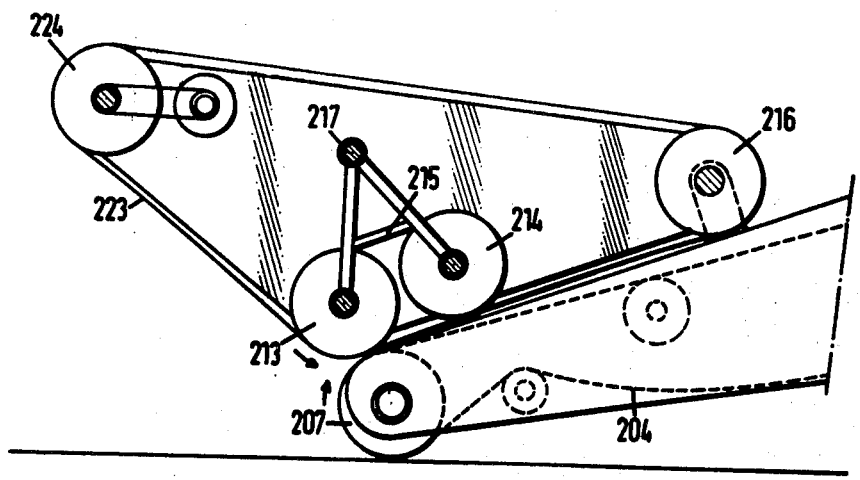
FIG. 6 shows a side elevation of a preferred embodiment of the haulm plucker according to the invention.

In a preferred embodiment according to FIG. 6 top roller 213 is constructed as a guide roller for an endless belt 223 which is passed over a few other rollers 216, 224, roller 224 of which is arranged in front of top roller 213, in the direction of travel of the haulm plucker, and adjustable higher than said top roller 213, so that belt 223 runs from roller 224 diagonally downward to the nip. With this belt portion haulm is drawn to the nip. Roller 213 and a roller 214 situated behind it are rotatably mounted on a carrier 215 rocking around shaft 217. When, for instance, stones find their way into the nip roller 213 is pushed upwardly, but the same time roller 214 is moved downwardly, so that the two belts 223 and 204 remain pressed to-gether. These belts run at the same speed from the nip to roller 216.

I claim:

1. In a travelling haulm plucker for separating haulm from tubers as the latter remain in the ground, comprising a first and second means disposed to define a nip therebetween, said nip extending generally transversely to the direction of travel of the haulm plucker, each of said first and second means having an arcuate surface defining said nip, said arcuate surfaces being disposed relative to one another such that a line connecting the center of radius of said two arcuate surfaces extends upwardly and forwardly of the direction of travel of the haulm plucker, drive means for driving at least one of said arcuate surfaces at a surface speed greater than the speed of travel of the haulm plucker, support means supporting said arcuate surfaces in a position wherein said nip opens towards and adjacent to the ground over which the haulm plucker travels whereby haulm to be separated passes through the nip between said two members, one of said arcuate surfaces being disposed and arranged adjacent to said ground so as to press the soil below and adjacent to said nip such that the faster moving arcuate surfaces engaging the haulm causes the latter to separate from the tubers as the tubers are retained in the soil by said pressing action of said one arcuate surface.

2. In a travelling haulm plucker according to claim 1 wherein both of said first and second means have a circular surface defining said nip, said drive means rotatably driving both of said circular surfaces.

3. In a travelling haulm plucker according to claim 1 wherein at least one of said first and second means is formed as an endless and flexible member, and means supporting said endless and flexible member for travel along an endless path.

4. In a travelling haulm plucker according to claim 1 wherein said drive means includes an adjustable device for varying the speed of movement of said arcuate surfaces.

5. In a travelling haulm plucker according to claim 1 wherein one of said first and second means is fixedly mounted on said haulm plucker.

6. In a travelling haulm plucker according to claim 1 wherein biasing means are provided to effect a biasing force between said first and second means.

7. In a travelling haulm plucker according to claim 1 wherein rib means are disposed on at least one of said first and second means to facilitate interengagement of said arcuate surfaces with the haulm to be separated.

8. In a travelling haulm plucker according to claim 1 wherein one of said first and second means is a roller and the other is an endless and flexible means, and a support roller defining a circular path of travel for said endless and flexible means in a location where the latter defines said nip.

9. In a travelling haulm plucker according to claim 1 wherein at least one of said first and second means is formed as a first endless and flexible member, a plurality of rollers supporting said first endless and flexible member for travel along an endless path, and pivotal means pivotally mounting at least one of said rollers.

10. In a travelling haulm plucker according to claim 9 wherein said pivotal means comprises a pivotally mounted support carrier on which a pair of rollers are carried, a first one of said pair of rollers defining a circular path of travel for said first endless and flexible member in a location where the latter defines said nip.

11. In a travelling haulm plucker according to claim 10 wherein the other of said members is formed as a second endless and flexible member, said second of said pair of rollers being disposed adjacent to and above said second endless and flexible member, said support carrier being disposed such that when an obstruction passes into said nip, the support carrier is pivoted so that said first roller lifts away and said second roller moves toward said second endless and flexible member whereby both endless and flexible members remain pressed together.

* * * * *